United States Patent [19]

Hiroyuki

[11] Patent Number: 5,081,522
[45] Date of Patent: Jan. 14, 1992

[54] DUAL PICTURE VIDEO SIGNAL PROCESSSING CIRCUIT

[75] Inventor: Takahori Hiroyuki, Tokyo, Japan

[73] Assignee: Pioneer Electronic Corporation, Tokyo, Japan

[21] Appl. No.: 523,808

[22] Filed: May 16, 1990

[30] Foreign Application Priority Data

Sep. 27, 1989 [JP] Japan ................... 1-251134

[51] Int. Cl.⁵ .............................. H04N 5/272
[52] U.S. Cl. ........................ 358/22; 358/183
[58] Field of Search ............. 358/21 R, 22 PIP, 83, 358/22 C

[56] References Cited

U.S. PATENT DOCUMENTS 4,750,039  6/1988  Willis .................. 358/22 PIP
4,782,391  11/1988  McNeeley et al. ....... 358/22 PIP
4,802,000  1/1989  Willis ..................... 358/31

Primary Examiner—James J. Groody
Assistant Examiner—Kim Y. Vu
Attorney, Agent, or Firm—Wegner, Cantor, Mueller & Player

[57] ABSTRACT

A dual picture video signal processisng circuit performs a subpicture processisng after the Y/C separation when a composite video signal is supplied. When separate Y and C signals are supplied, the circuit performs the subpicture processing directly to the Y and C signals. By this feature the circuit automatically performs the subpicture processing both for the composite video signal and the separate Y and C signals for the subpicture, and deterioration of the picture quality of the subpicture is prevented.

1 Claim, 1 Drawing Sheet

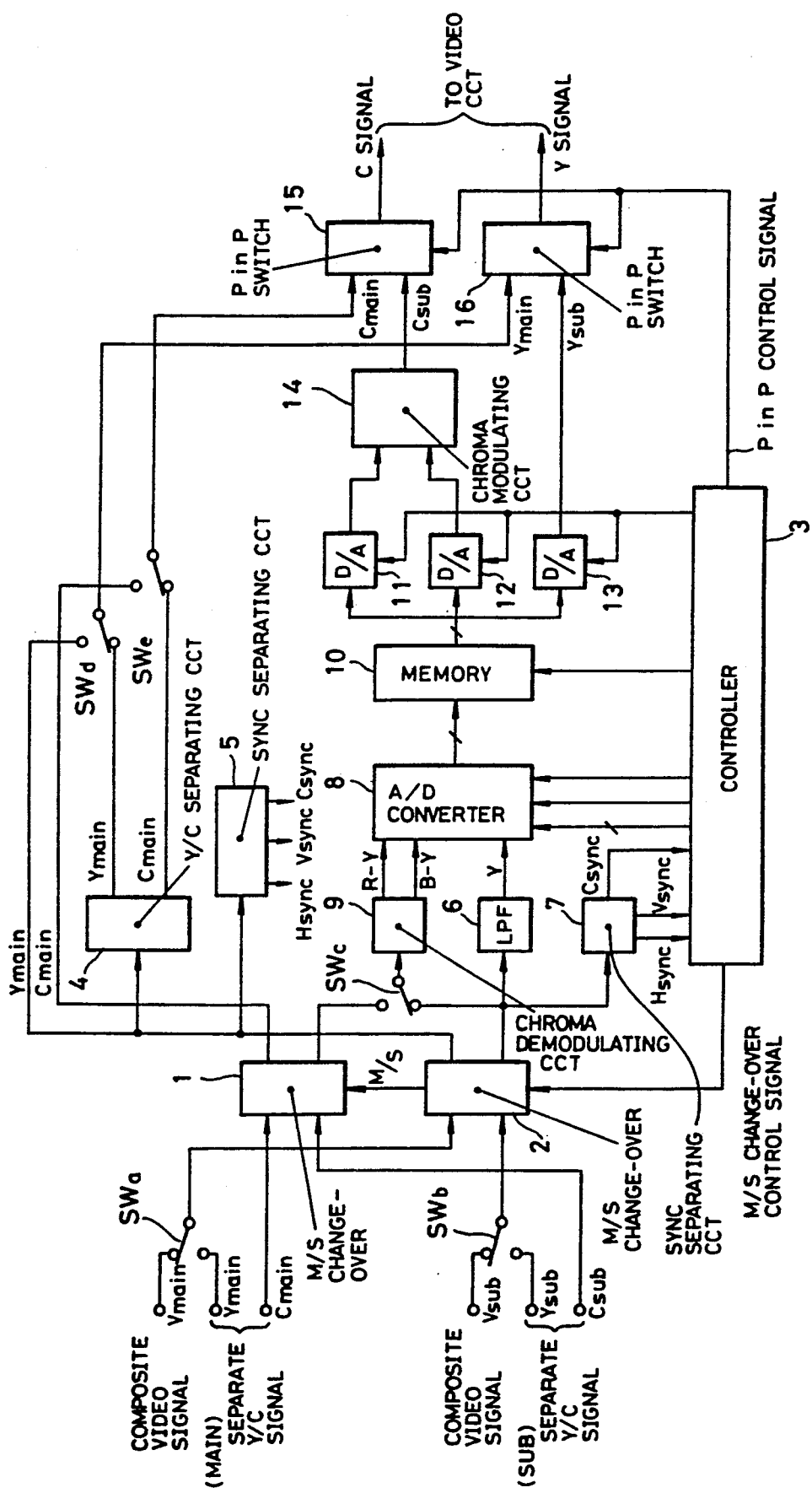

DUAL PICTURE VIDEO SIGNAL PROCESSSING CIRCUIT

BACKGROUND OF THE INVENTION

1. Field of the Invention

The present invention relates to a dual picture video signal processing circuit for use in the so-called Picture-in-Picture (P-in-P) television set capable of displaying a subpicture in a main picture.

2. Description of Background Information

In the P-in-P television sets, there are two types of signal processing configuration, i.e., a type in which a composite video signal for the subpicture is directly treated by a subpicture signal processing, and a type in which the subpicture signal processing is performed to signals obtained after the Y and C separation.

However, conventional P-in-P television sets are constructed that the subpicture signal processing can be performed to either of the composite video signal and the separate Y and C signals. When the subpicture signal processing is performed to the composite video signal, it is difficult to determine proper hue of the picture. For this reason, there has been a problem of degradation of the picture quality of the subpicture.

OBJECTS AND SUMMARY OF THE INVENTION

An object of the present invention is therefore to provide a dual picture video signal processing circuit by which the subpicture signal processing is possible both for the composite video signal and the separate Y/C signals, and without causing degradation of the picture quality of the subpicture.

The dual picture video signal processing circuit according to the present invention comprises first input means for receiving a composite video signal or separate Y and C signals as signal(s) for a main picture, second input means for receiving a composite video signal or separate Y and C signals as signal(s) for a subpicture, first separating means for separating the composite video signal supplied from the first separating means into Y and C signals, second separating means for separating the composite video signal supplied from the second input means into Y and C signals, selecting means for selecting either of the Y and C signals supplied from the first input means and the Y and C signals supplied from the second input means, subpicture signal processing means for performing a subpicture signal processing to either of the Y and C signals supplied from the second input means and the Y and C signals supplied from the second separating means, and superimposing means for superimposing the Y and C signals processed by the subpicture signal processing means on the Y and C signals passed through the selecting means.

In the dual picture video signal processing circuit according to the present invention, a composite video signal or separate Y and C signals are taken as signal(s) for the main picture and a composite video signal or separate Y and C signals are taken as signal(s) for the subpicture. If the composite video signal is supplied the subpicture signal processing is performed to the Y and C signals obtained by the Y/C separation and if separate Y and C signals are supplied the subpicture signal processing is directly effected to the separate Y and C signals, and subsequently the signals obtained through the subpicture signal processing are superimposed on the Y and C separation signal of the composite video signal supplied as a signal for the main picture or the separate Y and C signals.

BRIEF DESCRIPTION OF THE DRAWING

FIG. 1 is a block diagram showing an embodiment of the present invention.

DETAILED DESCRIPTION OF THE PREFERRED EMBODIMENT

The embodiment of the present invention is specifically described with reference to the accompanying drawings.

As shown in FIG. 2, the circuit is then supplied to receive a composite video signal or separate Y and C signals as signal(s) for a main picture. When a composite video signal is supplied to the circuit, it is then supplied to one of two stationary contacts of a change-over switch SWa. When separate Y and C signals are supplied to the circuit, the Y signal is supplied to the other stationary contact of the change-over switch SWa, and the C signal is supplied to an M/S (Main/Sub) change-over circuit 1 as one input signal thereof. The composite video signal or the Y signal selected by the change-over switch SWa is supplied to an M/S change-over circuit 2 as one input signal thereof. The circuit also receives a composite video signal and separate Y and C signals as signal(s) for the subpicture. If the circuit receives a composite video signal, the composite video signal is supplied to a change-over switch SWb as an input signal thereof. If separate Y and C signals are supplied, the Y signal is supplied to the other stationary contacts of the change-over switch SWb, and the C signal is supplied to the M/S change-over circuit 1 as the other input signal thereof. The composite video signal or the Y signal selected by the selection switch SWb is supplied to the M/S change-over circuit 2 as the other input signal thereof. The M/S change-over circuits 1 and 2 are controlled by an M/S change-over control signal supplied from a controller 3.

If a composite video signal is supplied to the circuit as a main picture signal, the composite video signal is supplied to a Y/C separating circuit 4 and a sync separating circuit 5 through the selection switch SWa and the M/S change-over circuit 2. Also, the C signal is supplied to the other input of the selector switch SWe through the M/S change-over circuit 1. The selector switches SWd and SWe are controlled to select the Y and C signals separated at the Y/C separating circuit 4 when the composite video signal is supplied to the circuit, and to select the Y and C signals when those signals are directly supplied to the circuit.

On the other hand, when a composite video signal is supplied to the circuit as a subpicture signal, the composite video signal is supplied to the selector switch SWc through the selector switch SWb and the M/S change-over circuit 2. This composite video signal is also supplied to an LPF (Low Pass Filter) 6 and a sync separating circuit 7. The LPF 6 is configured to permit the Y signal component contained in the composite video signal to pass therethrough and supplies it to the A/D converter 8 of the next stage. The sync signal separating circuit 7 is configured to extract the horizontal and vertical sync signals and supplies them to the controller 3. When the separate Y and C signals are supplied to the circuit as subpicture signals, the Y signal is supplied to the A/D converter 8 after passing through the selector switch SWb, the M/S change-over circuit 2, and the LPF 6. The C signal is supplied to the other input of the selector switch SWc through the M/S change-over circuit 1. The selector switch SWc is configured to select the composite video signal having passed through the M/S change-over circuit 2 when it is supplied to the circuit, and to select the C signal having passed through the M/S change-over circuit 1 when separate Y/C signals are supplied to the circuit. The selector switches SWa through SWe are interlocked with each other, and the switch positions are controlled by a manual operation or the operation of the controller 3.

The composite video signal selected by the selector switch 7 is demodulated into color difference signals R-Y and B-Y at a chroma demodulation circuit 9, and the demodulated signals are supplied to a time-division A/D converter 8 at the next stage. The A/D converter 8 is configured to convert the Y signal supplied from the LPF 6 and the color difference signals R-Y and B-Y supplied from the chroma demodulator circuit 9 into digital signals in a time-division fashion, and the digital signals are stored in a memory 10. The data of color difference signals R-Y and B-Y and the Y signal, when read-out from the memory, is supplied to D/A converters 11 through 13 in which the data is converted to analog signals, respectively. The control of the A/D conversion, the writing and reading of data into and from the memory, and the D/A conversion is performed by the controller 3. When the size of the subpicture is to be reduced to ⅓ of the main picture, the controller 3 performs control operations so that the subpicture signal is processed as follows. In the A/D converter 8, every third scanning line of the subpicture signal is converted to a digital signal, and the digitized signal is written into the memory 10. At the time of the read-out, a timing control is performed so that the digitized signal is read-out at a rate three times faster than the writing speed. This signal processing operations are called "subpicture signal processing", generally.

The color difference signals R-Y, B-Y after the D/A conversion are modulated into the C (chroma) signal at a chroma modulation circuit 14, and the C signal produced by the modulation is supplied to a P in P switch circuit 15. On the other hand, the Y signal after the D/A conversion is directly supplied to a P in P switch circuit 15. The C and Y signals for the main picture, selected by the selector switches SWe and SWd are supplied to the P in P switch circuits 15 and 16. The P in P switch circuits 15 and 16 are controlled by control signals supplied from the controller 3, to superimpose the C and Y signals for the subpicture on predetermined regions of the C and Y signals for the main picture.

The C and Y signals after the superimposition are supplied to a video circuit (not shown), so that the subpicture image whose size is reduced by ⅓ is simultaneously displayed in a predetermined region of the main picture.

As described above, the dual picture video signal processing circuit according to the present invention is configured to perform the subpicture signal processing after the Y/C separation when a composite video signal is supplied as the subpicture signal, and perform the subpicture signal processing directly when separate Y and C signals are supplied. Therefore, the subpicture signal processing can be performed automatically both for the composite video signal and the separate Y and C signals. Moreover, the subpicture signals obtained by the subpicture signal processing are superimposed on the main picture signals at the stage where the subpicture signals are treated as the Y and C signals, so that the degradation of the picture quality of the subpicture is prevented.

As described in the foregoing, the dual picture processing circuit according to the present invention is configured that a composite video signal or separate Y and C signals are taken as the main picture signal and a composite video signal or separate Y and C signals are taken as the subpicture signal. When the composite video signal is supplied as the subpicture signal, the composite video signal is separated into Y and C signals, and the Y and C signals are treated by the subpicture signal processing subsequently. When the separate Y and C signals are supplied as the subpicture signals, those signals are directly treated by the subpicture signal processing. Then the Y and C subpicture signals are superimposed on Y and C signals separated from the composite video signal supplied as the main picture signal or the separate Y and C signals supplied as the main picture signals. Therefore, the subpicture signal processing is possible both for the composite video signal and the separate Y and C signals, and the degradation of the picture quality of the subpicture is prevented.

What is claimed is:

1. A dual picture video signal processing circuit comprising:
    first input means for receiving a composite video signal or separate Y and C signals as signal(s) for a main picture;
    second input means for receiving a composite video signal or separate Y and C signals as signal(s) for a subpicture;
    first separating means for separating said composite video signal supplied from said first input means into Y and C signals;
    second separating means for separating said composite video signal supplied from said second input means into Y and C signals;
    selecting means for selecting either of said Y and C signals supplied from said first input means and said Y and C signals supplied from said second input means;
    subpicture signal processing means for performing a subpicture signal processing to either of said Y and C signals supplied from said second input means and said Y and C signals supplied from said second separating means; and
    superimposing means for superimposing said Y and C signals processed by said subpicture signal processing means on said Y and C signals passed through said selecting means.

* * * * *